3,682,685
METHOD OF TREATING GLASS FIBERS
Charles E. Rix and Karol J. Mysels, Winston-Salem, N.C., assignors to Penick & Ford Limited, Cedar Rapids, Iowa
No Drawing. Filed Mar. 30, 1970, Ser. No. 23,961
Int. Cl. C03c 25/02
U.S. Cl. 117—46 CA                                  9 Claims

ABSTRACT OF THE DISCLOSURE

A process for preparing heat cleaned glass fibers wherein the fibers are first sized with a starch-based size including an insolubilizing agent capable of transforming any inorganic constituents of said size into water-insoluble compounds upon pyrolysis in an oxidizing atmosphere, and pyrolyzing the size composition in an oxidizing atmosphere. The resulting ash residue is characterized by low electrical conductivity.

---

The production of glass fibers for a variety of industrial uses involves extremely critical processing techniques in order to minimize the breakage of the monofilaments used in the formation of skeins. Since the monofilaments are rather susceptible to abrasion which usually results in breakage, considerable effort has been directed towards finding methods that will eliminate this unwanted abrasion. The methods generally used for this purpose require the application of a lubricating composition to the filaments to serve as a protective coating during the various processing steps. After the protective coating has served its purpose, it is usually removed by burning. Among the lubricants which have been investigated in connection with glass fiber production, formulations based on starch as well as certain starch derivatives have proven to be particularly suitable. Such formulations commonly include waxes and other additives in order to achieve more effective protection for the fibers.

Although the starch based formulations exhibit superior lubricating properties for the glass fibers and can be removed by burning, they also possess the serious disadvantage of leaving residual, water-soluble inorganic salts on the glass fibers. The presence of such salts makes the fibers unsatisfactory for use in electrical insulation because, in the presence of moist air, the surface of the fibers becomes conductive due to the presence of these salts. Repeated washing of the starches as a means of removing the electrolytes is impractical in view of the large quantities of water needed and the fact that significant quantities of electrolytes remain even after the washing procedure. Washing with dilute hydrochloric acid is somewhat more effective in this regard, but this approach is accompanied by partial degradation of the starch.

Accordingly, it is the primary objective of the present invention to offer an effective solution to the problem of water-soluble inorganic residues resulting from the combustion of starch and starch derivatives.

Another object is to provide a starch composition which, when used in the processing of glass fibers, gives a product that is suitable for use as an electrical insulator.

An additional object is to provide a process for preparing modifications of starches and starch derivatives without altering appreciably their lubricating properties in sizing compositions or their combustion properties and the appearance of the residual ash obtained thereby.

Simply stated, this invention provides a method for utilizing starch and starch derivatives whereby water-insolubilization of inorganic materials present results upon combustion of the treated starches. The resultant water-insolubility of the residual ash makes such treated starches ideally suited to the production of glass fibers destined for use in electrical insulation applications.

To carry out the process of this invention, small quantities of insolubilizing agents are added to the starch or starch derivative in any suitable manner taking care that said agents are uniformly dispersed throughout the mass. The treated starches are then utilized in the normal manner in glass fiber production processes and form water-insoluble residues upon burning. It has been found that phosphates and finely divided silica are especially effective as insolubilizing agents. In order to reduce the quantities of residual ash on the glass fibers, the starch or starch derivative is preferably subjected to a preliminary washing procedure prior to treatment with the insolubilizing agent. This washing procedure also reduces the amounts of insolubilizing agents required. Although the previous history of the starch or starch derivative will determine the amounts of insolubilizing agents required, levels of approximately 5 percent or less (based on the dry weight of the starch material) are generally sufficient to produce the desired effect.

For evaluation purposes the treated starches prepared in accordance with the present invention are subjected to a standard ash resistance test. This test is conducted by heating a 47 gram sample of the treated starch at 650° C. for 4 hours. The resulting ash is then slurried in 250 milliliters of deionized water and is removed by filtration. Electrical resistance of the filtrate is measured using a commercially available conductivity meter with platinum electrodes (available from Industrial Instruments, Inc. in Cedar Grove, N.J., as Model RC16B2). The results are expressed in ohms for a cell constant of 1.0.

In one preferred embodiment of the invention, benzyl-substituted starch having 0.14 degree of substitution (D.S.) and prepared as described in U.S. Pat. 3,462,283 is added to sufficient water to give a 30–35 percent aqueous slurry. Dilute phosphoric acid is then added to the well-stirred slurry until a concentration of 0.25 percent by weight (based on the dry benzyl-substituted starch) is reached. The pH of the mixture is immediately readjusted to approximately 5 to 7 by the addition of dilute ammonium hydroxide. Agitation of the mixture is continued for a period of time in order to achieve uniform dispersion of the phosphoric acid. The treated benzyl-substituted starch is collected by suitable filtration means or centrifugation and is air dried. Benzyl-substituted starch treated in this way routinely gives an ash having a value greater than 200,000 ohms when subjected to the standard ash resistance test as compared with 5,000–8,000 ohms for the ash residue from untreated benzyl-substituted starch.

A variety of phosphorus compounds may be substituted for the phosphoric acid to give equally satisfactory results. It is preferred that the compounds chosen do not include metal cations because the addition of metal ions tends to defeat the intended purpose of the invention. Accordingly, those phosphorus-containing compounds which do not contribute electricity-conducting moieties to the residual ash are preferred. Examples are the ammonium and amine phosphates as well as alkyl and aryl phosphates and phosphites such as diethylphosphite, dihexylphosphite, 1-naphthylphosphite, dibenzylphosphite, triphenylphosphite, propylphosphate, triamylphosphate, tricresylphosphate and tribenzylphosphate. The quantities of additive required will depend on the phosphorus content of the additive as well as on the amounts of inorganic material contained in the starch sample to be treated. Where adequate washing of the starch has been effected, additive levels of approximately two percent or less (by weight based on phosphorus content and the weight of the dry starch) and, more preferably less than one percent are usually sufficient to impart insolubility to the electrolytes present. Although washing tends to reduce the amounts of insolubilizing agents required, such washing is not an effective substitute for treatment with insolubilizing agents. This is exemplified by the following data:

| | Ash resistance values in ohms | | | | |
|---|---|---|---|---|---|
| | Untreated | One water wash | Two water washes | Three water washes | Treated [1] |
| Pearl corn starch | 21,000 | 130,000 | 225,000 | 265,000 | 600,000 |
| Benzylated starch (0.14 D.S.) | 6,400 | 9,000 | 9,500 | 13,000 | 495,000 |

[1] Insolubilizing agent was diammonium hydrogen phosphate applied to the unwashed starch in one treatment at the 0.34 weight percent level based on the weight of the dry starch.

When using insolubilizing agents that are acidic, it is desirable to neutralize such agents either before or soon after addition in order to minimize degradation of the starch polymer chain. Again, it is desirable that the added neutralizing agents not contribute electricity-conducting moieties to the residual ash.

In another preferred embodiment of this invention, finely divided silica is uniformly dispersed throughout a benzylated starch of 0.14 D.S. by agitating a 30–35 percent aqueous slurry with minor quantities of colloidal silica. In order to limit the amounts of silica required, it is important that the particle size be rather small. The particle size should not exceed approximately 45 millimicrons in diameter and, preferably, should be less than about 15 millimicrons. If the starch material being treated has been adequately washed, silica levels of 5 weight percent or less (based on the dry weight of the benzylated starch) are sufficient to insolubilize the inorganic content of the starch. The dispersibility of the silica is improved by rendering the aqueous benzyl-substituted starch slurry slightly alkaline through the addition of a suitable base such as ammonium hydroxide or sodium hydroxide to give a pH of about 8 to 10. The benzylated starch-silica slurry is agitated for a sufficient period of time to effect gross distribution of the silica in the starch matrix. The pH of the mixture is then adjusted to approximately 5 to 7 by the addition of a suitable acid such as nitric or hydrochloric acid. Agitation is continued for a period of time to insure uniform dispersion of the silica and the treated benzylated starch is then collected by filtration or centrifugation and dried. Treated benzylated starch thus prepared gives an ash resistance value of approximately 65,000 ohms as compared with 5,000–8,000 ohms for the residual ash from untreated benzylated starch. Then effectiveness of the silica as an insolubilizing agent is enhanced by the addition of small amounts of sodium fluoride. Incorporation of approximately 0.01 to about 0.2 percent by weight sodium fluoride (based on the dry weight of the benzylated starch) into the starch slurry yields a product that exhibits ash resistance values of at least 12,000 ohms.

It will be appreciated that the period of time required to disperse the insolubilizing agent throughout the starch matrix will depend on a number of factors such as physical state and solubility of the agent, degree of agitation and pH. Satisfactory results may be obtained by dry blending of the mixture using a suitable blender; however, it is preferable to work with an aqueous slurry of the starch or starch derivative. By using an aqueous slurry, adequate dispersion of the agent may be obtained in about 15–30 minutes whereas dry blending requires somewhat longer periods of time.

The process of this invention may be applied to any starch or starch derivative, but it is particularly suitable for chemically derivatized starches since they usually contain significant amounts of inorganic material. When using an aqueous slurry for the dispersion step, it is desirable that only minimum amounts of water be utilized. A mixture comprising one part of starch or a starch derivative and about two parts of water is usually required to give a workable slurry. Greater amounts of water may be used but significant losses of insolubilizing agents may take place during the final filtration when using water-soluble agents.

The size compositions utilizing the threated starch or starch derivatives described herein may be prepared via methods well known in the art. Typically, such compositions involve heating of an aqueous slurry of the starch or starch derivative in a pressure container to effect solution or suspension of the starch. A suitable wax or vegetable oil, preferably in the form of an aqueous emulsion, is blended with the partially cooled starch mixture to produce the desired size composition. The starch or starch derivative generally constitutes from about 35 to about 85 percent of the size composition exclusive of the liquid carrier. A variety of additives such as emulsifiers, wetting agents and cationogenic lubricants may also be used for improving the properties of the size composition in a manner that is well known to those skilled in the art. Although the embodiments described herein disclose the combination of the insolubilizing agent with the starch component prior to preparation of the size, such agent may also be added directly to the liquid medium in which the size is being prepared.

The following examples will give a more detailed understanding of the present invention, but they are not intended to limit the scope of said invention. The benzylated starch used in Examples 1 through 5 as well as Examples 10 through 13 was prepared using the general method described in U.S. Pat. 3,462,283.

EXAMPLE 1

To a well-stirred slurry of 216 grams of benzylated starch (0.14 D.S.) in 440 grams of water were added 5 milliliters of dilute phosphoric acid (corresponding to 0.5 gram of $H_3PO_4$ as determined by previous analysis). The pH of the mixture dropped to 3.4 and was immediately readjusted to 5.2 by the addition of concentrated ammonium hydroxide. The resulting mixture was stirred for 1 hour at the end of which time the mixture was filtered and the treated benzylated starch was air dried. When subjected to the standard ash resistance test, this material yielded 0.14% ash residue with a resistance of 550,000 ohms compared with 0.11% ash and 6,400 ohms resistance for untreated benzylated starch.

EXAMPLE 2

To a well-stirred slurry of 216 grams of benzylated starch (0.14 D.S.) in 430 grams of water was added a solution of 0.476 gram of ammonium dihydrogen phosphate in 10 milliliters of water. Stirring was continued for 1 hour before collecting the solid by filtration and allowing it to air dry. This material gave 0.13% ash with a resistance of 565,000 ohms.

EXAMPLE 3

A mixture of 241 grams of benzylated starch (0.14 D.S., 10 percent moisture) and 0.821 gram of technical grade diammonium hydrogen phosphate was blended for 2 hours in a Reed blender of 400 grams capacity. The ash resistance test of the blended material gave 0.28% ash with a resistance of 455,000 ohms.

EXAMPLE 4

To a well-stirred slurry of 243 grams of benzylated starch (0.14 D.S.) in 340 grams of water was added a solution comprising 0.69 gram of 85% phosphoric acid, 1.61 grams of triethylamine and 100 grams of water (pH of this solution was approximately 7.0). Stirring was continued for 1 hour before collecting the solid by filtration and allowing it to air dry. This material gave 0.16% ash residue with a resistance value of 335,000 ohms.

EXAMPLE 5

The procedure of Example 4 was repeated except that dibutylamine (1.50 grams) was substituted for the triethylamine. The standard ash resistance test yielded 0.17% residual ash possessing a resistance of 410,000 ohms.

EXAMPLE 6

To a well-stirred slurry of commercially-available pearl corn starch (243 grams) in water (440 grams) was added 0.82 gram of diammonium hydrogen phosphate. The resulting mixture was stirred for 1 hour before collecting the treated starch by filtration and allowing it to air dry. This product yielded 0.11% residual ash on combustion with a resistance of 600,000 ohms compared with 21,000 ohms for untreated corn starch upon combustion.

EXAMPLE 7

The procedure of Example 6 was repeated except that dibutyl phosphite (1.20 grams) was substituted for the diammonium hydrogen phosphate. The standard ash resistance test gave 0.10% residual ash with 350,000 ohms resistance.

EXAMPLE 8

The procedure of Example 6 was repeated except that waxy maize (Amaizo 77 pearl corn starch available from American Maize Products Company) was substituted for the pearl corn starch. The residual ash (0.14%) had a resistance value of 125,000 ohms compared with 6,800 ohms for untreated waxy maize.

EXAMPLE 9

The procedure of Example 6 was repeated except that hydroxyethylated starch (P.G. 200 available from Penick & Ford, Ltd. in Cedar Rapids, Iowa) was substituted for the pearl corn starch and that the starch was twice washed with 440 milliliters of water per wash prior to treatment with the aqueous diammonium hydrogen phosphate. The standard ash resistance test gave 0.12% residual ash with 490,000 ohms resistance compared with 1,650 ohms for untreated P.G. 200 and 6,500 ohms for twice-washed P.G. 200.

EXAMPLE 10

The procedure of Example 6 was repeated except that benzylated starch of 0.05 D.S. was substituted for the pearl corn starch. The residual ash (0.15% had a resistance value of 280,000 ohms compared with 2,900 ohms for a similar benzylated starch sample that had been washed with three separate 440-milliliter portions of water.

EXAMPLE 11

The procedure of Example 6 was repeated except that benzylated starch of 0.25 D.S. was substituted for the pearl corn starch. The residual ash (0.13%) had a resistance value of 500,000 ohms compared with 5,400 ohms for a similar benzylated starch sample that had been washed with three separate 400-milliliter portions of water.

EXAMPLE 12

To a well-stirred slurry of 120 grams of benzylated starch in 224 grams of water was added sufficient dilute sodium hydroxide to give a pH of 9.0. With continued stirring was added 3.24 grams of a 15 percent aqueous dispersion of colloidal silica ("Ludox SM" colloidal silica obtained from E. I. Du Pont Company) having a particle size of 7 to 8 millimicrons. After stirring the resulting mixture for an additional 15 minutes, the pH was adjusted to 5.0 by the addition of dilute hydrochloric acid. Stirring was continued for 2 more hours and the product was then collected by filtration and was air dried. This product gave 0.27% ash residue with a resistance value of 66,000 ohms compared with 0.11% ash and 6,400 ohms resistance for untreated benzylated starch.

EXAMPLE 13

The procedure of Example 10 was repeated except that 60 milligrams of sodium fluoride was added to the slurry in conjunction with the colloidal silica. The product gave 0.30% ash residue with a resistance value of 124,000 ohms.

What is claimed is:

1. A process for treating glass fibers comprising the steps of:
   applying to said fibers a sizing composition containing minor quantities of inorganic constituents and including a lubricant based on starch or a starch derivative and an insolubilizing agent essentially devoid of metal cations and capable of transforming the inorganic constituents of said composition into water-insoluble compounds upon pyrolysis in an oxidizing atmosphere; and
   subjecting the sized fibers to a sufficiently high temperature in an oxidizing atmosphere to effect pyrolysis of a major portion of said composition.

2. The process of claim 1 wherein said lubricant constitutes about 35 to about 85 percent by weight of the sizing composition exclusive of the liquid carrier.

3. The process of claim 1 wherein said insolubilizing agent comprises a phosphorous- or silicon-containing material and constitutes less than about 5 percent by weight of the sizing composition exclusive of the liquid carrier.

4. The process of claim 1 wherein said insolubilizing agent comprises a phosphate- or phosphite-containing compound.

5. The process of claim 1 wherein said insolubilizing agent comprises colloidal silica.

6. A process for preparing glass fibers that are characterized by the low electrical conductivity of residual ash adhering thereto, said process comprising the steps of:
   treating glass fibers with a lubricating composition containing minor quantities of inorganic constituents, said composition comprising benzylated starch of 0.01 to 1.0 degree of substitution, an insolubilizing agent essentially devoid of metal cations and capable of transforming the inorganic constituents of said composition into water-insoluble compounds upon pyrolysis in an oxidizing atmosphere, and a liquid carrier; and
   heating the treated glass fibers in an oxidizing atmosphere for a period of time sufficient to effect pyrolysis of substantially all of said lubricating composition adhering to said treated glass fibers.

7. The process of claim 6 wherein said insolubilizing agent is selected from the group consisting of phosphoric acid, ammonium dihydrogen phosphate and diammonium hydrogen phosphate and comprises up to 5 percent by weight of said lubricating composition exclusive of said liquid carrier.

8. The process of claim 6 wherein said insolubilizing agent comprises colloidal silica possessing a particle size below about 45 millimicrons.

9. The process of claim 6 wherein said benzylated starch comprises about 35 to about 85 percent by weight of said lubricating composition exclusive of said liquid carrier.

References Cited
UNITED STATES PATENTS

| | | | |
|---|---|---|---|
| 3,481,771 | 12/1969 | Doering | 117—126 GQ |
| 3,287,096 | 11/1966 | Marzocchi et al. | 117—126 GQ |
| 2,570,830 | 10/1951 | McCarty et al. | 117—126 GQ |
| 2,754,224 | 7/1956 | Caroselli | 117—46 CA |

WILLIAM D. MARTIN, Primary Examiner

D. COHEN, Assistant Examiner

U.S. Cl. X.R.

106—210, 214; 117—126 GQ